COMPUTER PULSE CONTROL SYSTEM

Filed Sept. 23, 1952 5 Sheets-Sheet 1

INVENTORS
SAMUEL LUBKIN
EUGENE LEONARD
BY S. C. Yuter
ATTORNEY

INVENTORS
SAMUEL LUBKIN
EUGENE LEONARD
BY S. C. Yuter
ATTORNEY

INVENTORS
SAMUEL LUBKIN
EUGENE LEONARD
BY S. C. Yuter
ATTORNEY

April 16, 1957 S. LUBKIN ET AL 2,789,220

COMPUTER PULSE CONTROL SYSTEM

Filed Sept. 23, 1952 5 Sheets-Sheet 4

INVENTORS
SAMUEL LUBKIN
EUGENE LEONARD
BY S. C. Yuter
ATTORNEY

April 16, 1957 S. LUBKIN ET AL 2,789,220

COMPUTER PULSE CONTROL SYSTEM

Filed Sept. 23, 1952 5 Sheets-Sheet 5

INVENTORS
SAMUEL LUBKIN
EUGENE LEONARD
BY S. C. Yuter
ATTORNEY

United States Patent Office 2,789,220

Patented Apr. 16, 1957

2,789,220

COMPUTER PULSE CONTROL SYSTEM

Samuel Lubkin, Brooklyn, and Eugene Leonard, Elmhurst, N. Y., assignors, by mesne assignments, to Underwood Corporation, New York, N. Y., a corporation of Delaware Application September 23, 1952, Serial No. 311,016

5 Claims. (Cl. 250—27)

This invention relates to digital computers, and more particularly to a system for controlling the pulse signals utilized in a high-speed electronic digital computer.

Computing consists of performing arithmetic operations on numbers. A digital computer performs arithmetic operations with numbers expressed in the form of digits. The binary system of computation, using the binary digits "1" and "0," is well suited to computers since a complete binary order of a binary number may be expressed by the presence or absence of a particular condition; for example, the presence or absence of a given magnetic state on a unit area or cell of a magnetic medium, or the presence or absence of a pulse at a specified position in a train of pulses.

In computers of the data processing type, combinations of binary digits may represent alphabetic information in addition to numbers. The processing of this information may consist of sorting, collating and extraction of specified items from a group in accordance with predetermined criteria. Data processing may also include arithmetic operations.

Any connected series of arithmetic or data processing operations requires the storage of the information for later reference. In one type of storage system information coded in terms of binary digits is magnetically recorded in cells on the surface of a rotating drum. If the cell is magnetized in one direction, the digit it represents is "1." If the cell is magnetized in the other direction, the digit is "0." The magnetized cells corresponding to individual digits may be arranged in a peripheral track on the cylindrical surface of the drum. A stationary magnetic head is associated with the track and performs the operations of writing (recording), reading and erasing information in that track.

A connected series of arithmetic or data processing operations implies the necessity for tranferring information from a predetermined cell at a particular time to the computer. Therefore, some method of synchronizing the operation of the computer with the rotating drum is required to select the location of the cell carrying the recorded information. This requires that the exact position of the drum be communicated to the computer where a comparison of the drum position with the location of the information required by the computer is made.

It is also necessary to time or coordinate the pulse trains which represent the information employed to solve a particular problem so that the computer will operate properly.

One known way of synchronizing the computer with the drum is to record a timing track in the form of a continuous sine wave or a series of pulses along the periphery of the cylindrical surface of the drum parallel to the information tracks. This requires the construction of special circuitry to generate a train of sine waves or pulses for this particular purpose. In accordance with this method, the timing track is employed directly to generate the pulse repetition rate used in the computer. Due to the difficulty of accurately closing the sine wave or pulse train on the magnetic drum, and due to the difficulty of maintaining the drum speed constant during the recording of the timing signal, the generated pulse repetition rate may vary during each drum cycle.

The significance of this variation is that the time interval between corresponding points on two successive pulses from the timing track will not remain constant. The variation may be cumulative over a portion of a drum revolution and in an extreme case, for example, thirty pulses from one segment of the timing track may occupy the same time interval as thirty-one pulses from a different but equal segment.

As a result of the multiplication of the timing track pulses to produce a satisfactory pulse repetition rate, even a small deviation in the timing track recording will seriously affect the proper operation of the computer circuitry since it is absolutely necessary that the pulse repetition rate remain constant.

A further difficulty inherent in using a magnetically recorded timing track is that the track is subject to inadvertent alteration or erasure. This would necessitate a re-recording that would require special equipment not normally available.

It is also necessary that the width of the generated pulse signals be maintained constant since all other pulse signals in the computer are derived from them and variations in the pulse widths will produce errors in computation.

An object of the invention, therefore, is to provide an improved method of and apparatus for controlling the pulse repetition rate and width of pulse signals employed in an electronic digital computer.

Another object of the invention is to provide improved apparatus for controlling the transfer of information between a movable storage medium and an electronic digital computer.

A further object of the invention is to provide improved apparatus for maintaining the pulse repetition rate of signals used in a high-speed computer in synchronism with the velocity of a rotatable magnetic drum which is used as the computer data storage system.

In accordance with one embodiment of the invention the pulse signals are generated by a controlled pulse generator, and width control apparatus maintains the width of the pulse signals constant. A permanent control track on the magnetic drum generates a control signal when the magnetic drum is rotated. If a continued deviation in synchronism occurs between the frequency of the control signal and the generated pulse repetition rate, the repetition rate of the generated pulse signal is changed to restore synchronism.

Other objects, features and advantages will appear in the subsequent detailed description which is accompanied by drawings wherein.

The headings to various sections of this specification are inserted to facilitate the recognition of different parts of the description and do not modify or otherwise affect the scope of the specification, which should be interpreted as if they were absent.

*Brief outline of the pulse control system*

Figure 1:
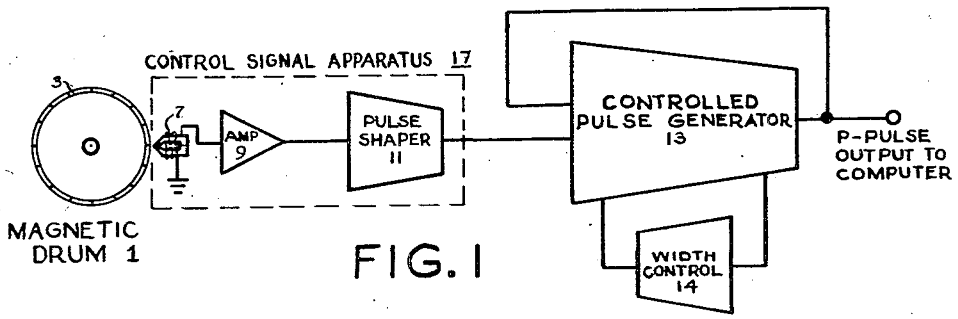
Figure 1 is a schematic block diagram of a computer pulse control system in accordance with one embodiment of the invention.

Referring more particularly to the computer pulse control system illustrated in Figure 1, which will be described in greater detail hereinafter, digital information may be recorded in tracks on the magnetizable surface of the rotatable magnetic drum 1.

The control channel 3 is engraved along the outer periphery of the surface of the magnetic drum 1. The control channel 3, which comprises a series of evenly-spaced recesses filled with a magnetizable material, is disclosed and claimed in the co-pending application of Samuel Lubkin, Serial No. 314,021, filed October 10, 1952.

The control signal apparatus 17 is employed to amplify and shape the control signal generated by the control channel 3. The control signal apparatus 17 includes the control head 7, the amplifier 9 and the pulse shaper 11.

The control head 7 is mounted adjacent to the control channel 3. Each filled recess is magnetized by rotating the magnetic drum 1 past the magnetic control head 7 when the control head 7 is energized by a suitable current. The filled recesses will then contain magnetic markers which will generate a control signal at the control head 7 having a frequency proportional to the velocity of the magnetic drum 1 when the magnetic drum 1 is rotated during the normal operation of the computer. The control signal is amplified by the amplifier 9 coupled to the control head 7, and shaped to form control signal pulses by the pulse shaper 11 connected to the output of the amplifier 9. The control signal is then coupled to the controlled pulse generator 13.

The controlled pulse generator 13 supplies the basic pulse signal which is employed to generate all of the pulse signals used in the computer. The controlled pulse generator 13 includes a provision for varying the pulse repetition rate of the generated signal.

The computer pulse signal is fed back to the input of the controlled pulse generator 13 and the computer pulse repetition rate is compared with the frequency of the control signal. If a continued rather than an isolated deviation from synchronism exists between the pulse repetition rate and the control signal frequency which is related to the rotational velocity of the magnetic drum 1, the pulse repetition rate is varied to restore synchronism by control apparatus within the controlled pulse generator 13. The controlled pulse generator is the subject per se of the co-pending application, Serial No. 316,860, of Eugene Leonard, filed October 25, 1952.

The width control 14, connected to the controlled pulse generator 13, produces symmetrical pulses for use in the computer by controlling the bias on a shaper in the controlled pulse generator 13. The width control 14 is disclosed and claimed in the co-pending application of Eugene Leonard, Serial No. 320,182, filed November 13, 1952.

Thus the invention provides improved apparatus for controlling the pulse repetition rate and width of the pulse signals employed in an electronic digital computer by separately generating the computer pulse signals and using the non-erasable control channel to generate a control signal which is employed to synchronize the computer pulse repetition rate with the magnetic drum velocity only if a continued deviation from synchronism occurs. Moreover, random imperfections in the control track engraving will not affect the operation of the computer.

*Permanent control channel*

Figure 2:
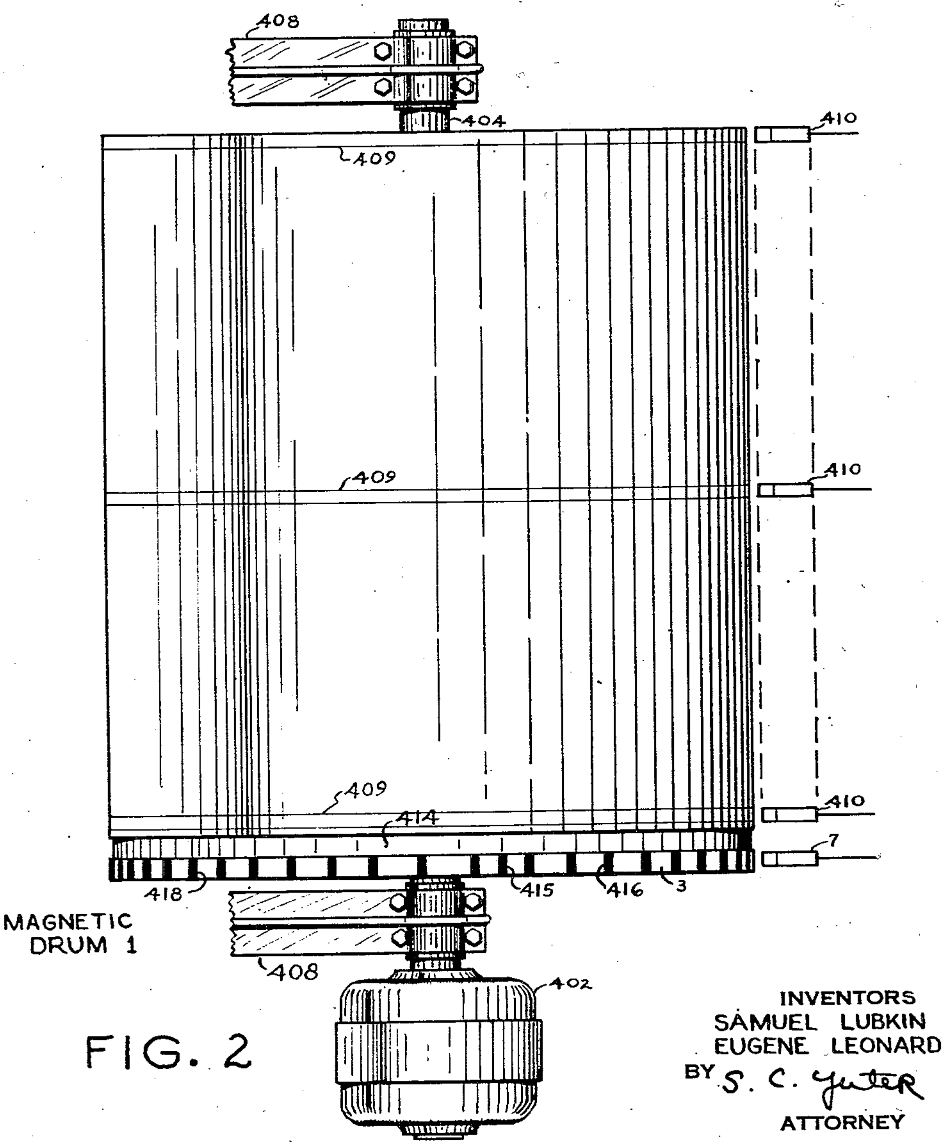
Figure 2 is an elevational view of the rotatable magnetic drum shown in Figure 1 and includes the permanent control channel.
Figure 3:
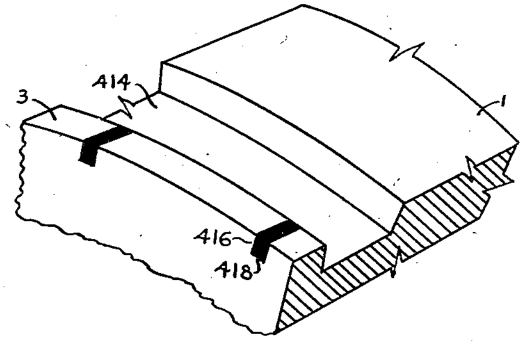
Figure 3 is a fragmentary view in perspective of a portion of the rotatable magnetic drum further illustrating the permanent control channel.

Referring to Figures 2 and 3, the magnetic drum 1, which may be constructed from aluminum or any other non-magnetic material, is rotated by the motor 402 which is coupled to the drum shaft 404. The ends of the shaft are positioned in bearings mounted in the support members 408. The magnetic drum 1 may have a diameter of ten inches and a length of twelve inches.

The periphery of the magnetic drum 1 is coated with a suitable magnetic material, for example, iron oxide, and information in binary form is magnetically recorded in information tracks 409 along the periphery of the magnetic drum 1 by a plurality of magnetic heads 410 each associated with one information track. It will be understood that the magnetic heads 410, the mounting members 408 and motor 402 will be held fixed by suitable supports, not shown, so that the periphery of the magnetic drum 1 will be scanned or recorded upon by the magnetic heads 410 as the drum periphery moves past the magnetic heads 410.

The control channel 3 is preferably located at one end of the drum 1 and comprises a series of slots 416 filled with magnetic material and magnetized to provide a plurality of magnetic markers 418 along the periphery of the magnetic drum 1. The dimensions of each slot 416 may be .015 inch in depth, .010 inch in width and .250 inch in length. Two hundred and forty magnetic markers 418, preferably equally spaced in the control channel 3, are used to generate a suitable control signal. An index magnetic marker 415 is included between two of the magnetic markers 418 and provides a reference mark so that particular cells in a given information track can be located by the computer.

The slots 416 may be accurately positioned by employing a master plate which is precision engraved with a series of index marks corresponding to the number and spacing of the slots 416. The master plate is rigidly fastened to the shaft 404 in such a manner that the exact location of each slot 416 can be easily ascertained and temporarily marked. A precision dividing head in conjunction with a rotary table could also be utilized to mark the locations of the slots 416.

The slots 416 may be cut by using an appropriate milling cutter and passing the magnetic drum 1 beneath the cutter at the marked positions. Prior to the control channel 3 engraving, a groove 414, having dimensions which may be .200 inch wide and .200 inch in depth, is cut into the periphery of the magnetic drum 1 parallel and next to the control channel 3. The purpose of the groove 414 is to facilitate the cutting of the slots 416.

After the slots 416 are cut they are filled with a suitable magnetic material, for example, red iron oxide in the form of a putty, or sprayed into the slots 416 using a more fluid mixture. The excess iron oxide between the slots 416 is then removed by wiping or grinding.

The control head 7 is suitably mounted opposite the control channel 3 and employed initially to magnetize the magnetic material within the slots 416. The markers can also be magnetized by positioning a permanent magnet adjacent to the control channel 3. Thus each filled slot 416 acts as a small magnet or magnetic marker 418 (see Figure 3).

When the magnetic drum 1 is rotated the control channel 3 will pass beneath the control head 7 and generate a control signal which is utilized after amplification and shaping to provide the pulses which synchronize the generated signal pulse repetition rate with the drum velocity as explained above.

Of course, the control channel may be located at any position on the periphery of the drum, and may also be placed on either of the end faces of the drum. In addition, the magnetic markers need not be slot shaped, but can be filled apertures or engravings of any shape, for example, circular.

Due to the shape and distribution of the magnetic field associated with each magnetic marker 418 as compared with that of a magnetized cell on the surface of the magnetic drum 1, the output from the control head 7 representing the control signal will be relatively large. In addition, since the slots 416 are mechanically engraved in the periphery of the magnetic drum 1, they cannot be accidentally erased or altered. If the magnetic markers 418 are inadvertently demagnetized, their location is not lost and the remagnetization will easily and readily restore the control channel 3.

Another advantage of an engraved control channel of this type is that no complex and special electronic circuitry need be provided. The use of mechanical methods employing standard tools results in a control channel which is not only permanent, but which can be constructed at a relatively low cost as compared with magnetically recording a sine wave or a series of pulses. In addition, the use of a permanent channel of this type minimizes the problem of providing accurate closure.

*Control signal apparatus*

For convenient reference, all positive and negative voltage supply busses will hereinafter be identified with a number corresponding with their voltage.

Figure 4:
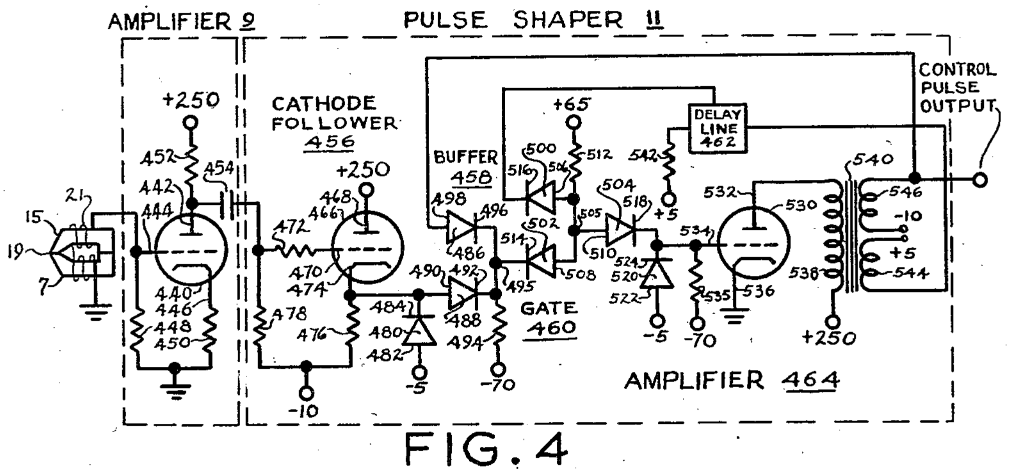
Figure 4 is a schematic illustration of the control signal apparatus shown in Figure 1.

Referring more particularly to Figure 4, the control head 7, which is coupled to the amplifier 9, comprises the pole pieces 15 which form an almost closed U, the gap 19 between the open ends of the U being positioned adjacent to the control channel. A winding 21 encircles the pole pieces 15.

The amplifier 9 includes the vacuum tube 440 having an anode 442, a control grid 444, and a cathode 446. The winding 21 is connected between the control grid 444 and ground. The grid resistor 448 and the cathode resistor 450, connected respectively to the control grid 444 and the cathode 446, are grounded. The anode 442 is linked to the positive supply bus 250 by the anode resistor 452. The output of the amplifier 9 is coupled to the input of the pulse shaper 11 by the coupling capacitor 454.

The pulse shaper 11 comprises a cathode follower 456, a buffer 458, a coincidence gate 460, an electrical delay line 462, and an amplifier 464.

The cathode follower 456 includes the vacuum tube 466 comprising the anode 468 connected to the positive supply bus 250, the control grid 470 which is coupled to the capacitor 454 by means of the resistor 472, and the cathode 474 which is linked to the negative supply bus 10 by the cathode resistor 476. The grid resistor 478 is connected between the junction of the coupling capacitor 454 and the resistor 472, and the negative supply bus 10. The output from the cathode follower 456 is coupled from the cathode 474 and is clamped at a negative voltage of 5 volts by the diode 480 which has its anode 482 connected to the negative supply bus 5 and its cathode 484 connected to the cathode 474.

The diode 480 (and others hereinafter mentioned and not otherwise described) may be any unilateral conductor but is preferably of the germanium crystal type.

Figure 5:
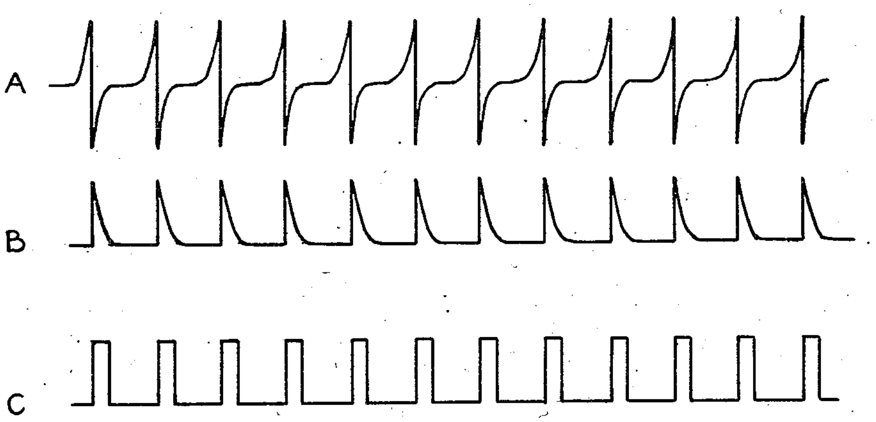
Figure 5 is a table diagrammatically illustrating the pattern of signals obtained during the operation of the control signal apparatus.

When the magnetic drum is rotated a signal will be generated at the control head 7 which will swing positive and then negative as each magnetic marker passes the gap 19 of the control head 7 (see line A of Figure 5). This signal will be amplified and inverted by the amplifier 9 and fed to the cathode follower 456. Due to the biasing of the cathode follower 456, only the negative portion of the signal from the control head will appear at the output of the cathode follower 456 and it will be inverted to have a positive swing having a lower amplitude of minus 5 volts (see line B of Figure 5).

The buffer 458 comprises the diodes 486 and 488 and operates to isolate the input signals to the diodes from each other. The anode 490 of the diode 488 is coupled to the cathode 474 of the vacuum tube 466. The cathode 492 of the diode 488 is linked to the negative supply bus 70 by the resistor 494. The cathode 496 of the diode 486 is connected to the cathode 492 at the junction 495. The anode 498 of the diode 486 is coupled to the positive output of the amplifier 464 as will be hereinafter explained.

The coincidence gate 460 includes the diodes 500 and 502 with their respective anodes 506 and 508 connected together at the junction 505 and coupled to the positive supply bus 65 by the resistor 512. The coincidence gate 460 will pass a signal when positive signals are simultaneously present at the diodes 500 and 502. The cathode 514 of the diode 502 is coupled to the junction 495. The cathode 516 of the diode 500 is connected to a tap on the delay line 462. The buffer diode 504 couples the junction 505 to the amplifier 464 and the cathode 518 of the buffer diode 504 is clamped at a negative voltage of 5 volts by the diode 520 having its anode 522 connected to the negative supply bus 5 and its cathode 524 connected to the cathode 518 of the diode 504. The buffer diode 504 functions as a buffer between the coincidence gate 460 and the amplifier 464, and prevents excessive current flow through the diode 520.

The amplifier 464 includes the vacuum tube 530 having an anode 532, a control grid 534 which is connected to the cathode 518 of the buffer diode 504, and the cathode 536 which is grounded. The anode 532 is coupled to the positive supply bus 250 by the primary winding 538 of the output transformer 540. The grid 534 is linked to the negative supply bus 70 by the grid resistor 535.

The delay line 462 has one end connected to the positive supply bus 5 by the resistor 542, and the other end connected to one terminal of the secondary winding 544 of the output transformer 540. The remaining terminal of the secondary winding 544 is coupled to the positive supply bus 5. The secondary winding 546 of the output transformer 540 connects the negative supply bus 10 to the anode 498 of the diode 486 as explained above. The output transformer 540 is adjusted to deliver a positive control signal at the outer terminal of the secondary winding 546, and a negative control signal at the outer terminal of the secondary winding 544.

The operation of the pulse shaper will now be explained. Between signals from the output of the cathode follower 456 the following conditions exist in the buffer 458 and the gate 460.

The diode 488 is normally conductive so that the junction 495 is clamped at minus five volts. The diode 486 is normally disconnected since its cathode 496 which is at minus five volts is at a higher potential than its anode 498 which is at minus ten volts. The diode 502 is conductive so that the junction 505 is also clamped at minus five volts. The diode 500 is disconnected since its cathode 516 is at plus five volts; so that the gate 460 will pass a signal appearing at the diode 502 because the junction 505 will not be clamped at a particular voltage.

When a signal appears at the output of the cathode follower 456, it is coupled to the amplifier 464 through the diodes 488, 502 and the normally conductive diode 504. The positive output signal appears at the secondary winding 546 and is fed back through the diode 486 to the diode 502. The diode 486 will conduct since the signal will exceed minus five volts. Thus, the output signal is maintained and passed by the gate 460 because the diode 500 remains non-conductive.

In the meantime the negative output signal from the secondary winding 544 is being fed back to the diode 500 through the delay line 462. When the negative output signal, which will be more negative than minus five volts, passes through the delay line 462 to the tap, it will cut off the gate 460 since diode 500 will conduct and disconnect the diode 504 to terminate the output signal. If the delay line tap is chosen so that a delay exists equal to the desired pulse width of the control signal, for example, eight microseconds, the positive output signal will comprise a series of pulses (see line C of Figure 5) corresponding to the signals from the control head 7.

The control signal is then fed to the controlled pulse generator 13 where the generated pulse frequency is compared with the control signal frequency.

*Controlled pulse generator*

Figure 6:
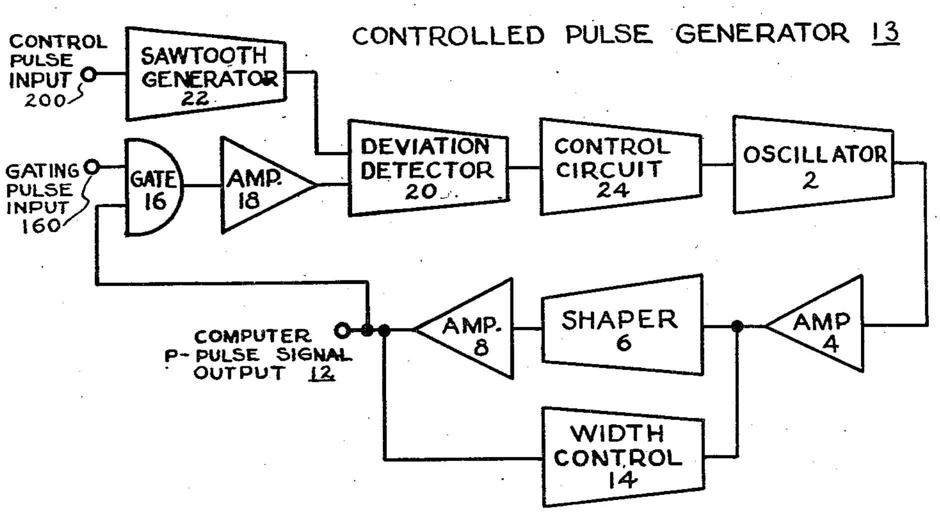
Figure 6 is a schematic block diagram of the controlled pulse generator shown in Figure 1 and includes the width control unit.

Referring more particularly to the controlled pulse generator illustrated in Figure 6, which will be described in greater detail hereinafter, the oscillator 2 is adjusted to generate a frequency equal to the pulse repetition rate required by the computer. The sine wave output of oscillator 2 is coupled to the amplifier 4 which amplifies the signal. The shaper 6, which is connected to the amplifier 4, shapes the amplified sine wave into proper pulse shape. The pulses are then amplified by the amplifier 8, which is coupled to the shaper 6, and the amplified pulses which then comprise the basic computer pulse signal appear at the output 12 of the amplifier 8 in the form of a pulse train designated by the P pulses on line P of Figure 7. The width control 14 links the pulse output 12 with the input to the shaper 6 and operates to maintain the width of the P pulses at a predetermined value.

A portion of the P pulse output is coupled to one input of the gate 16. The second input of the gate 16 is linked to a source (not shown) of gating pulses in the computer. The gating pulses are derived from the P pulses, each gating pulse occurring simultaneously with a particular P pulse in each pulse train, for example, the P2 pulse, for reasons which will be explained below.

Figure 7:
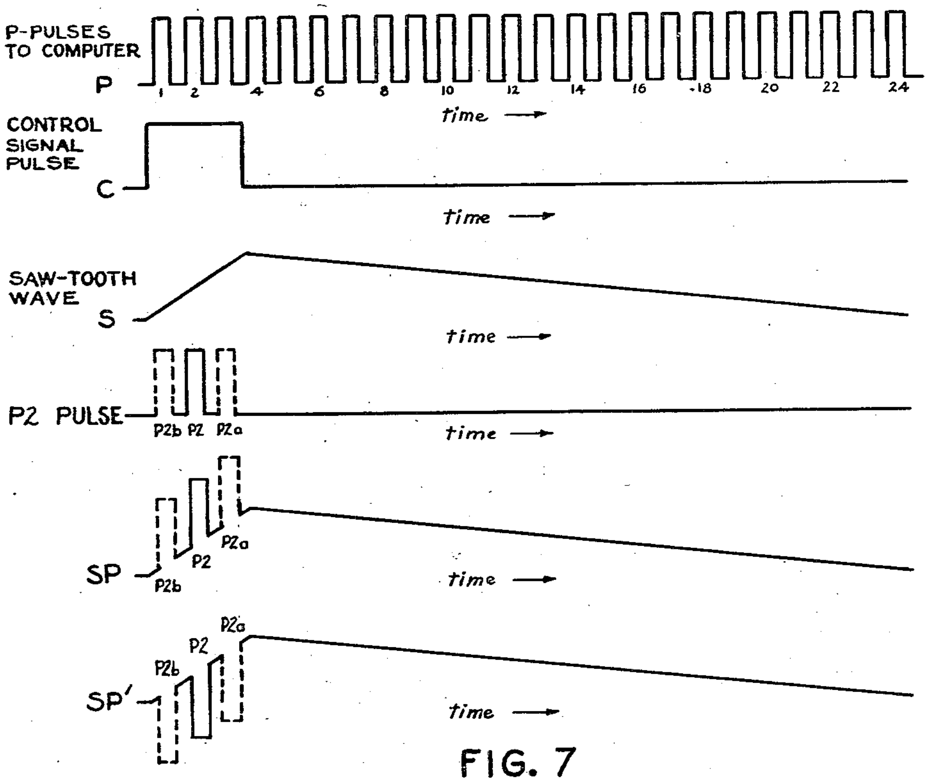
Figure 7 is a table diagrammatically illustrating the pattern of wave forms induced during the operation of the controlled pulse generator.

The P-pulse train is arbitrarily assumed to have twenty-four pulses, each train occurring once during the period of each control pulse designated by the pulse C on line C of Figure 7. (The C pulses correspond to the control pulses on line C of Figure 5.) In actual practice, however, forty-eight P pulses are generated by the oscillator 2 for each C pulse delivered by the control signal apparatus, and the ratio may be higher if desired.

The gate 16, more accurately termed a coincidence gate, is adjusted to deliver an output pulse when positive pulses are simultaneously present at the two inputs of the gate 16. One P2 output pulse will occur during each control pulse period and will be amplified by the amplifier 18 coupled to the output of the gate 16. The output of the amplifier 18 is connected to one input of the deviation detector 20. A saw-tooth generator 22 is connected to a second input of the deviation detector 20.

The saw-tooth generator 22 receives the control pulses from the control signal apparatus, (see line C of Fig. 7). Each control pulse C received by the saw-tooth generator 22 initiates a single saw-tooth wave S, which is shown on line S of Figure 7. The saw-tooth generator 22 is adjusted to deliver a wave form having a relatively short rise time as compared with the fall time. The saw-tooth wave S and the P2 pulse are superimposed (see line SP) and the combined voltage is fed to the input of the deviation detector 20. The output voltage of the deviation detector 20 will be a function of the phase of the saw-tooth wave S and the P2 pulse.

It should now be noted that the P2 pulse was particularly chosen to be gated to the deviation detector 20 since it will normally occur one-half way up the slope of the rising portion of the saw-tooth wave S. This will be the case only when the frequency of the oscillator 2 and the velocity of the magnetic drum are in synchronism. When synchronism exists, the output voltage of the deviation detector 20 will be at a fixed reference potential.

If the drum velocity increases (or the oscillator 2 frequency decreases), the P2 pulse will arrive late with respect to the control pulse, and the P2 pulse will be shifted up the slope of the saw-tooth wave S and will appear as pulse P2*a* (see line SP). The deviation detector 20 is designed so that the combined amplitude of the pulse P2*a* and the saw-tooth wave S will produce a higher output voltage when a continued deviation from synchronism of this type occurs.

Similarly, if the drum velocity decreases (or the oscillator 2 frequency increases), the P2 pulse will shift lower on the slope of the saw-tooth wave S and will appear as pulse P2*b*, and the output voltage of the deviation detector 20 will be lowered with respect to the fixed reference potential if the deviation from synchronism continues.

A control circuit 24 couples the output of the deviation detector 20 to the oscillator 2. The control circuit 24 includes a reactance tube modulator which operates to change the frequency of the oscillator 2 when an increased or decreased output voltage from the deviation detector 20 is fed to the control circuit 24.

The system is arranged so that other than an isolated deviation from synchronism between the drum velocity and the oscillator 2 frequency will cause the oscillator to change frequency in a sense such that synchronism is restored. Stated otherwise, the oscillator frequency will follow the average frequency of the control signal produced by the engraved magnetic markers on the drum.

In summary, the pulse repetition rate of the computer pulse signals is produced by the following process:

A sine wave signal is generated using any suitable oscillator. The sine wave signal is then shaped into the pulse shape required and any adequate shaper may be employed. The pulse signal frequency is then compared with the frequency of the control signal generated by the magnetic markers in the control track. Any suitable comparison means may be utilized which will detect a continued deviation from synchronism between the pulse signal frequency and the control signal frequency. The output of the comparison means indicating a continued deviation is then used to change the frequency of the oscillator to restore synchronism employing any adequate frequency changing apparatus.

If the oscillator frequency is to be multiplied to develop the pulse repetition rate required in the computer, then a suitable frequency divider may be employed to divide the pulse signal frequency preparatory to comparison.

Of course, the controlled pulse generator is not restricted to use with a rotatable magnetic drum but may be used with any movable member.

Therefore, a precision recorded drum track is unnecessary since random errors of recording will not affect the overall synchronism between the drum and the pulse trains of the computer. Of course, this would not be the case if the drum track were used directly to generate the pulse repetition rate, since an error in recording would be instantaneously reflected as a change in the pulse repetition rate.

*Detailed description of the controlled pulse generator*

Figure 8:
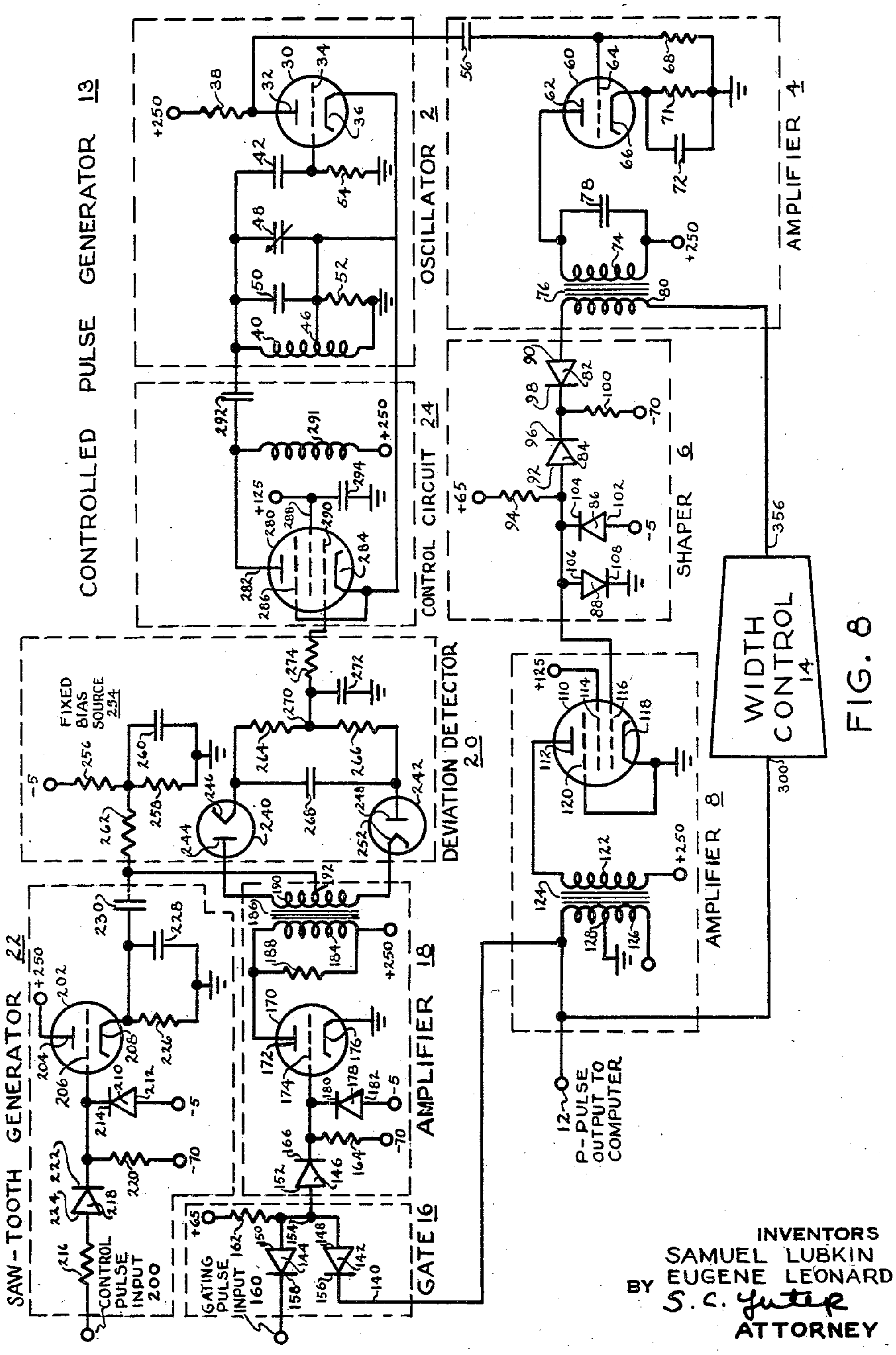
Figure 8 is a diagrammatic illustration of the controlled pulse generator shown in Figure 6 with the width control unit illustrated in block diagram form.

Referring more particularly to the oscillator 2 shown in Figure 8, which is known to those skilled in the art as a Hartley oscillator, the vacuum tube 30 comprises an anode 32, a control grid 34, and a cathode 36. The anode 32 is connected to the positive bus 250 by the anode resistor 38. The control grid 34 is coupled to one end of the inductor 40 by the capacitor 42. The other end of the inductor 40 is grounded. The cathode 36 is connected to the tap 46 on the inductor 40. The tuning capacitors 48 and 50 in parallel are connected between the control-grid end of the inductor 40 and the tap 46. A resistor 52 couples the tap 46 to ground. The grid-leak resistor 54 grounds the control grid 34.

The capacitor 48 is variable and is utilized to adjust the operating frequency of the oscillator 2 to a frequency which will produce the pulse repetition rate required by the computer. The sine wave output of the oscillator 2 is coupled to the amplifier 4 by the coupling capacitor 56.

The amplifier 4 includes the vacuum tube 60 which comprises the anode 62, the control grid 64 and the cathode 66. The control grid 64 is connected to the coupling capacitor 56 and is grounded by the grid-leak resistor 68. The cathode resistor 71, connected between the cathode 66 and ground, biases the vacuum tube 60. The bypass condenser 72 bypasses the cathode to ground. The anode 62 is linked to the positive bus 250 by the primary winding 74 of the transformer 76. The tuning capacitor 78, which is in parallel with the primary winding 74, is chosen to tune the amplifier 4 to the oscillator 2 frequency. The amplified sine wave appears across the secondary winding 80 of the transformer 76. One end of the secondary winding 80 is coupled to the shaper 6 and the other end is linked to the output connection 356 of the width control 14. For present purposes, the potential on the output connection 356 can be assumed to be minus ten volts.

The shaper 6 includes the current limiting diodes 82 and 84, and the clipping diodes 86 and 88. The anode 90 of the diode 82 is connected to the secondary winding 80. The anode 92 of the diode 84 is coupled to the positive bus 65 by the resistor 94. The cathode 96 of the diode 84 and the cathode 98 of the diode 82 are connected together and are coupled to the negative bus 70 by the resistor 100.

The limiting diodes 82 and 84 limit the swing of the amplified sine wave between minus five and zero volts since diode 84 will disconnect when its cathode potential is greater than zero volts because its anode 92 is clamped between ground and minus five volts as will be explained below. The diode 82 will become non-conductive when its anode potential is less than minus five volts for the reason that diode 84 is normally conducting.

The anode 102 of the diode 86 is connected to the negative bus 5. The cathode 104 of the diode 86, and the anode 106 of the diode 88 are connected together and to the anode 92 of the diode 84. The cathode 108 of the diode 88 is grounded. Since the diode 88 will prevent a positive signal swing, and the diode 86 will prevent a negative swing greater than minus five volts, the sine wave is effectively clipped between zero and minus five volts to produce a train of pulses having relatively short rise and fall times (see line A of Figure 10). The sine wave swing is initially limited by the diodes 82 and 84 which minimize the amount of current that will pass through the diodes 86 and 88. The pulses, described above as P pulses, are then amplified and inverted by the amplifier 8.

The amplifier 8 includes the vacuum tube 110 having an anode 112, a screen grid 114, a control grid 116, a cathode 118, and a suppressor grid 120 connected to the cathode 118 and ground. The control grid 116 is coupled to the anode 106 of the diode 88. The screen grid 114 is connected to the positive bus 125. The anode 112 is linked to the positive bus 250 by the primary winding 122 of the output transformer 124. The positive P-pulse output appears between one end of the secondary winding 126 and the grounded center tap 128 of the secondary winding 126. A negative P-pulse signal is available between the other end of the secondary winding 126 and ground. A portion of the positive P-pulse output is fed to the input connection 300 of the width control 14 which maintains the P-pulse width constant. Another portion of the positive P-pulse output is coupled to the input connection 140 of the gate 16.

The gate 16 comprises the diodes 142 and 144 with their respective anodes 148 and 150 connected together at the junction 154. The cathode 156 of the diode 142 is coupled to the input connection 140. The cathode 158 of the diode 144 is connected to the input connection 160. The resistor 162 couples the positive bus 65 to the junction 154. The buffer diode 146 couples the gate 16 to the amplifier 18. The anode 152 of the diode 146 is connected to the junction 154. The resistor 164 links the negative bus 70 with the cathode 166 of the buffer diode 146.

The input connection 160 is connected to a source of gating pulses in the computer (not shown). Each gating pulse is present simultaneously with the occurrence of the P2 pulse at the input connection 140. Between pulses the potentials of the input connections 140 and 160 are maintained at minus ten volts. The cathode 166 of the diode 146 is clamped at a voltage of minus five volts, and the cathode 166 potential cannot become more negative.

Between coincident input pulses, the diodes 142 and 144 are conductive since their anodes are initially at a higher potential than their cathodes. The junction 154 may thus be maintained at a potential of minus ten volts by either diode. The junction 154 voltage of minus ten volts keeps the diode 146 from conducting because its cathode 166 is at a higher potential.

When pulses having a minus ten to a plus ten volt swing (for example) are simultaneously present at the two inputs, the same voltage swing will be present at the junction 154. When the junction voltage exceeds minus five volts, diode 146 will conduct and a pulse will appear across resistor 164. This pulse corresponds to the P2 pulse in time position and it is fed to the amplifier 18.

Amplifier 18 includes the vacuum tube 170 comprising an anode 172, a control grid 174, and a cathode 176 which is grounded. The control grid 174 is coupled to the cathode 166 of the diode 146, and is clamped at minus five volts by the diode 178. The cathode 180 of the diode 178 is connected to the control grid 174, and its anode 182 is coupled to the negative bus 5. The anode 172 is linked to the positive bus 250 by the primary winding 184 of the transformer 186. The resistor 188 is connected in parallel with the primary winding 184.

The amplified P2 pulse is impressed across the secondary winding 190 of the transformer 186 having a positive polarity at one terminal and a negative polarity at the other terminal. The center tap 192 of the secondary winding 190 is connected to a fixed-bias source 254 and to the output of the saw-tooth generator 22.

The saw-tooth generator 22 includes the vacuum tube 202 which comprises an anode 204, a control grid 206, and a cathode 208. The anode 204 is connected to the positive bus 250. The control grid 206 is clamped at minus five volts by the diode 210, its anode 212 being connected to the negative bus 5, and its cathode 214 being connected to the control grid 206.

Control pulses from the control signal apparatus are coupled to the control grid 206 from the input connection 200 by the resistor 216 and the diode 218 in series. The resistor 220 links the cathode 222 of the diode 218 to the negative bus 70. The anode 224 of the diode 218 is connected to the resistor 216.

The cathode 208 of the vacuum tube 202 is coupled to ground by the resistor 226. A capacitor 228 of relatively large capacitance is in parallel with the resistor 226. The cathode 208 is coupled to the center tap 192 of the transformer 186 in the amplifier 18 by the capacitor 230.

When a control pulse from the control signal apparatus is received at the input connection 200 and rises above minus five volts, the diode 218 will conduct. The corresponding swing in the cathode current will cause the voltage across resistor 226 to charge the capacitor 228. The time constant of the resistor 226 and capacitor 228 combination is chosen so that a saw-tooth wave is generated (see line S in Figure 7) which is coupled to the deviation detector 20.

The deviation detector 20 includes the vacuum tubes 240 and 242 which function as diode detectors. Vacuum tube 240 comprises the anode 244 and the cathode 246. Vacuum tube 242 comprises the anode 248 and the cathode 252. The fixed-bias source 254 is connected to the center-tap 192 of the transformer 186 and provides a convenient direct current level at the secondary winding 190, say minus 2½ volts. The fixed-bias source 254 includes the resistors 256 and 258 in series linking the negative bus 5 to ground. A capacitor 260 bypasses the resistor 258 to ground. A coupling resistor 262 connects the junction of the resistors 256 and 258 to the center-tap 192.

One terminal of the secondary winding 190 is connected to the anode 244 of the vacuum tube 240. The other terminal of the secondary winding 190 is connected to the cathode 252 of the vacuum tube 242. The cathode 246 and the anode 248 are coupled together by the resistors 264 and 266 in series, and by the capacitor 268 of large capacitance in parallel with the resistors 264 and 266. The output voltage of the deviation detector 20, which will normally be equal to the fixed-bias source 254 potential, appears at the junction 270 of the resistors 264 and 266. The output voltage is filtered by the capacitor 272 coupling the junction 270 to ground, and by the resistor 274 connecting the junction 270 to the input of the control circuit 24. The capacitor 272 is also chosen to have a relatively high capacitance.

When the amplified P2 pulse superimposed on the sawtooth wave S appears across the secondary winding 190 of the transformer 186, the vacuum tubes 240 and 242 will conduct. Capacitor 268 will slowly charge up to a voltage which is twice the maximum amplitude of the combined sawtooth wave S and the P2 pulse, since the polarity of the P2 pulse will be positive at the diode 240 terminal of the secondary winding 190 as shown on line SP of Figure 7, and negative at the diode 242 terminal of the secondary winding 190 as shown on line SP′. The P2 pulse will be positioned halfway up the slope of the saw-tooth wave S when the frequency of rotation of the drum and the oscillator 2 frequency are in synchronism.

When the capacitor 268 is fully charged, the anode currents of the vacuum tubes 240 and 242 will be cut off except at the voltage peaks. The output voltage of the deviation detector 20 will be half the voltage across the capacitor 268 because the resistors 264 and 266 are preferably chosen to be equal in resistance. The output voltage will remain at the reference potential of approximately minus 2½ volts during synchronism since the terminal voltages of the capacitor 268 will be equal in magnitude but opposite in polarity and the diodes 242 and 244 will conduct at voltage peaks.

If the drum velocity increases (or the oscillator 2 frequency decreases), P2 will drift up the slope of the saw-tooth S and will appear as P2*a*. P2*a* superimposed on the saw-tooth S exceeds the normal positive peak voltage level causing vacuum tube 240 to conduct a higher current and vacuum tube 242 to conduct a lower current. This will raise the positive charge on the capacitor 272 and produce an increased output voltage. The time constants of the circuit are chosen so that the voltage build up is relatively slow and an increased charge will only be achieved if the P2*a* pulse remains in that position for a continued time.

Similarly, if the drum velocity decreases (or the oscillator 2 frequency increases), pulse P2 will move down the slope and appear as pulse P2*b* which will cause an increase in the vacuum tube 242 current and a decrease in the vacuum tube 240 current. This will produce a negative output voltage with respect to the minus 2½ volt reference potential.

It should be emphasized that due to the relatively long time constants of the circuits involved, only a continued deviation from synchronism will produce a change in ouput voltage, and random errors in the magnetic marker recording will not affect the deviation detector output which is fed to the control circuit 24.

The control circuit 24 includes the vacuum tube 280 which comprises an anode 282, a cathode 284, a suppressor grid 286 connected to the cathode 284, a screen grid 288, and a control grid 290 which is coupled to the resistor 274. The anode 282 is linked to the positive bus 250 by the radio-frequency choke 291, and is coupled to the high-voltage end of the inductor 40 of the oscillator 2 by the coupling capacitor 292. The screen grid 288 is connected to the positive bus 125, and is bypassed to ground by the capacitor 294. The cathode 284 is connected to the tap 46 on the inductor 40.

The control circuit 24 operates as a reactance tube, an increase in the anode current of the vacuum tube 280 acting as a decrease in the inductance of inductor 40, since the anode radio-frequency current which will pass through the portion of the inductor 40 between the tap 46 and its high voltage end will lag the voltage across the inductor by ninety degrees.

The components of the control circuit 24 and the oscillator 2 are chosen so that when the normal minus 2½ volts is present at the output of the deviation detector 20, the oscillator 2 will oscillate at the desired frequency. When the deviation detector 20 output voltage increases positively, signifying a relative decrease in the oscillator 2 frequency, the control circuit 24 will draw more current through the inductor 40 decreasing the inductance and raising the oscillator 2 frequency. When the output voltage becomes more negative the reverse occurs. As explained above, this will bring the drum velocity and the oscillator 2 frequency into synchronism.

Therefore, the invention provides an improved method of controlling the pulse repetition rate employed in an electronic digital computer. Further, the production of random error due to an imperfectly recorded control track on a magnetic drum is minimized, and precision recording of numerous markers and exact control of the drum rotational velocity are unnecessary.

*Width control system*

Computer error may also result from varying pulse widths since all the pulse signals used in the computer are derived from the generated P pulses, and varying pulse widths may produce insufficient pulse overlapping. To maintain the pulse widths symmetrical and therefore constant, a width control system is provided which includes the oscillator and shaper of the controlled pulse generator 13.

Figure 10:
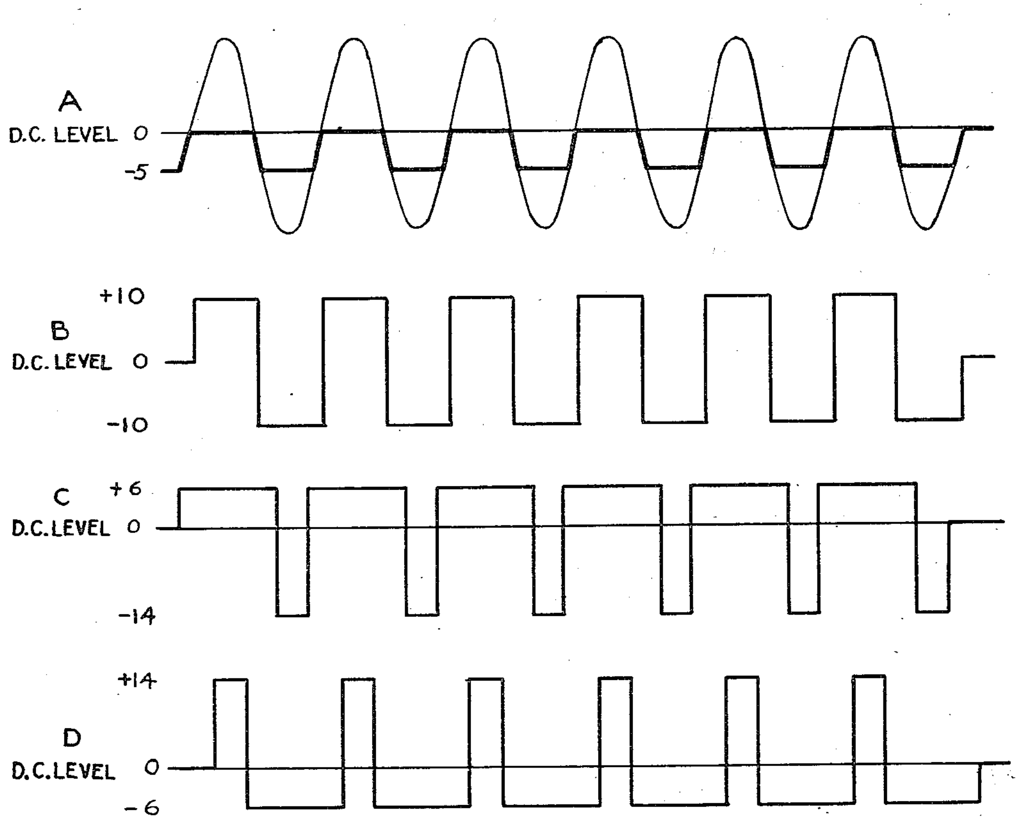
Figure 10 is a table diagrammatically illustrating the pattern of signals induced during the operation of the width control unit.

Referring to line A of Figure 10, the amplified sine wave from the oscillator 2 is clipped between zero and minus five volts by the shaper 6 to produce the P-pulse signals which are amplified by the amplifier 8 (see Figure 8). The direct current level or average voltage of the sine wave is zero volts. The width control functions to displace the sine wave at the shaper in a direction which will result in the continued generation of symmetrical P pulses, as illustrated on line B of Figure 10.

Initially, the system is arranged to produce P pulses having a positive swing which is slightly narrow and the width control adjusts the direct current level of the sine wave to widen the generated pulses and produce symmetrical P pulses. If symmetrical P pulses having a voltage swing between minus ten and plus ten volts are assumed, then the direct current level or average value of the symmetrical P pulses will be at zero potential. If the P pulses are too wide on their positive swing, then the direct current level will rise as illustrated on line C of Figure 10. Line D illustrates the narrowed pulse condition.

In accordance with the system, the sine wave is shifted by varying the direct current bias at the secondary winding 80 of the transformer 76 (see Figure 8) in order to displace the direct current level of the sine wave.

Figure 9:
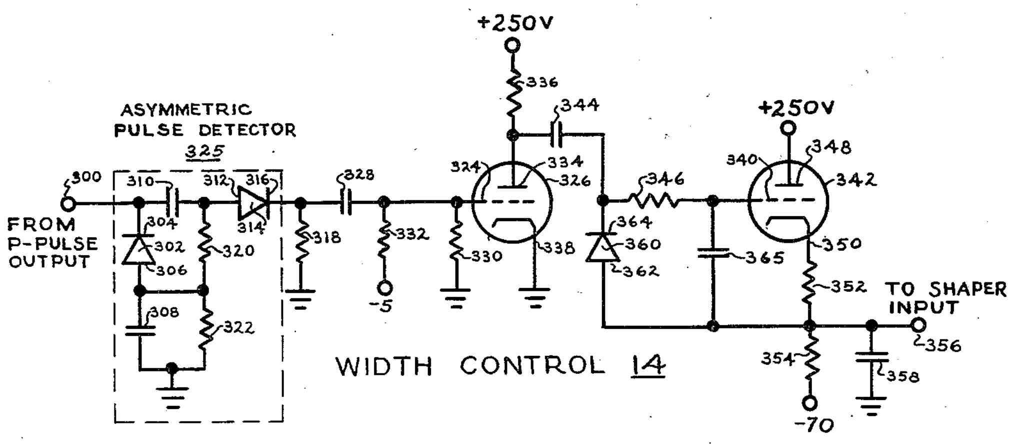
Figure 9 is a schematic illustration of the width control unit.

Referring to the width control 14 shown in detail in Figure 9, the input connection 300 is coupled to the P-pulse output of the system. The diode 302, which functions as a negative peak detector, has its cathode 304 connected to the input connection 300, and its anode 306 connected to the filter capacitor 308 which is grounded. A coupling capacitor 310 links the input connection 300 to the anode 312 of the limiting diode 314. The cathode 316 of the limiting diode 314 is grounded by means of resistor 318. The resistor 320 connects the anode 312 to the anode 306 of the diode 302. The resistor 322 is connected in parallel with the filter capacitor 308. The diodes 302 and 314 together with the capacitors 308 and 310, and the resistors 320 and 322, comprise the asymmetric pulse detector 325.

The cathode 316 of the limiting diode 314 is coupled to the control grid 324 of the vacuum tube 326 by the coupling capacitor 328. The grid-leak resistor 330 connects the control grid 324 to ground, and the resistor 332 couples the control grid 324 to the negative bus 5. The vacuum tube 326, which functions as an amplifier, also includes an anode 334 which is linked to the positive bus 250 by the anode resistor 336, and a cathode 338 which is grounded. The anode 334 is coupled to the control grid 340 of the vacuum tube 342 by the coupling capacitor 344 and the resistor 346 in series.

The vacuum tube 342 operates as an amplifier of the bootstrap amplifier types and includes the anode 348 connected to the positive bus 250, and the cathode 350 which is coupled to the negative bus 70 by the resistors 352 and 354 in series. The width control output connection 356 is connected to the junction of the resistors 352 and 354, and the filter capacitor 358 connects the output connection 356 to ground. The capacitor 365 couples the control gid 340 to the output connection 356.

The diode 360 clamps the negative peak of the output signal of the vacuum tube 326 at the width control output voltage level. This establishes an average direct current component of the signal which is more positive than the width control output voltage level. The diode 360 includes an anode 362 coupled to the output connection 356, and a cathode 364 connected to the junction of the coupling capacitor 344 and the resistor 346.

Now, assume that symmetrical P pulses (line B of Figure 10) are being generated by the pulse control system and appear at the input connection 300 of the width control 14. When the P pulses swing negative, the diode 302 of the asymmetric pulse detector 325 will conduct and the filter capacitor 308 will charge up to a value corresponding to the negative peak value of the P pulses, in this case minus ten volts. When the capacitor 308 is fully charged, the diode 302 will disconnect and the voltage at the anode 312 of the limiting diode 314 will be equal to the capacitor 308 voltage. Stated otherwise, the anode 312 will be biased at a value corresponding to the negative peak voltage of the P pulses. This bias voltage operates to displace the direct current level of the P pulses so that the new direct current level equals the negative peak voltage of the P pulses before being coupled through the coupling capacitor 310.

For example, the direct current level of symmetrical pulses having a voltage swing from minus ten to plus ten volts will be displaced from zero to minus ten volts to result in a voltage swing from minus twenty to zero volts at the diode 314. Since the cathode 316 of the limiting diode 314 is at ground potential, the limiting diode 314 will limit conduction to a positive signal, so that in this case a signal will not be coupled to the vacuum tube 326.

Now assume that the P pulses are too narrow and have a direct current level of zero volts and a voltage swing from minus six to plus fourteen volts (line D of Figure 10). The direct current level will be displaced from zero to minus six volts, a shift equal to the negative peak voltage of minus six volts, and the pulse will swing from minus twelve volts to plus eight volts. Therefore, a positive pulse representing an error in the production of symmetrical pulses is produced at the anode 312 having a magnitude related to the amount of asymmetry. The error signal will be conducted by the limiting diode 314 of the asymmetric pulse detector 325 and then coupled to the vacuum tube 326 where it will appear as a negative pulse at the anode 334.

Since the average direct current component of the output signal of the vacuum tube 326 cannot be more negative than the width control output voltage due to the clamping of diode 360, the average direct current component of the error signal will be less negative than the cathode 350 voltage for the reason that the resistance of resistor 352 is relatively low and the cathode 350 voltage will approximate the width control output voltage.

The error signal, which is filtered by the resistor 346 and the capacitor 365, is impressed on the grid 340 of the vacuum tube 342 to increase the anode 348 current. The increased current will increase the cathode 350 voltage to produce a width control output voltage corresponding to the error signal which is more positive than normal and which is related to the degree of asymmetry of the P-pulses.

The width control output voltage will be filtered by the capacitor 358 and a more positive direct-current error signal proportional to the amount of P-pulse asymmetry will appear at the output connection 356 of the width control 14.

This error signal is utilized to bias the shaper in the controlled pulse generator and it will displace the sine wave at the input to the shaper 6 in a positive direction to widen the positive P-pulse output from the shaper 6 and to widen the positive P-pulse output from the system due to the inverting of the pulse signals by the transformer 124 of the amplifier 8. If the P pulses are too wide, they are automatically narrowed by decreasing the shaper bias voltage.

Thus, the P pulses are maintained at a symmetrical shape and therefore a constant width to minimize the probability of error in the computer produced by insufficient overlapping of the pulses. In a similar manner, any distortion in the amplifier which produces asymmetrical pulses will be corrected.

In the drawings and in the detailed description of the computer pulse control system it has not been felt necessary to discuss in detail the various power supplies or the heaters which may be utilized for bringing the thermionic cathodes to operating temperature, since these elements are well known to those skilled in the art. In addition, in order to simplify the explanation of the invention, all D. C. potential sources and wave forms have been indicated by their individual magnitudes and polarities. It will be understood, of course, that these magnitudes and polarities are not critical and the invention is not so limited, the particular values given by way of illustration only.

While only one representative embodiment of the invention disclosed herein has been outlined in detail, there will be obvious to those skilled in the art, many modifications and variations accomplishing the foregoing objects and advantages, but which do not depart essentially from the spirit of the invention.

What is claimed is:

1. A timing system for controlling the pulse repetition rate and the width of pulse signals employed in an electronic digital computer having a rotatable magnetic drum comprising a controlled pulse generator to generate said pulse signals, width control apparatus to control the width of said pulse signals, a permanent control track on said rotatable magnetic drum, and a control head positioned adjacent to said permanent control track to generate a control signal when said rotatable magnetic drum is rotated, said controlled pulse generator being receptive to the control signal and operative to vary the repetition rate of the pulse signals and to restore synchronism when a continued deviation from synchronism occurs between the pulse repetition rate and the control signal frequency;

said permanent control track comprising a series of discrete magnetic elements permanently positioned on said drum.

2. A timing system for controlling the pulse repetition rate and the width of pulse signals employed in an electronic digital computer having a rotatable magnetic drum comprising a controlled pulse generator to generate said pulse signals, width control apparatus to control the width of said pulse signals, a permanent control track on said rotatable magnetic drum, and a control head positioned adjacent to said permanent control track to generate a control signal when said rotatable magnetic drum is rotated, said controlled pulse generator being receptive to the control signal and operative to vary the repetition rate of the pulse signals and to restore synchronism when a continued deviation from synchronism occurs between the pulse repetition rate and the control signal frequency; said permanent control track comprising a series of recesses extending circumferentially around the periphery of said drum with magnetized material positioned in said recesses.

3. A timing system for controlling the pulse repetition rate and the width of pulse signals employed in an electronic digital computer having a rotatable magnetic drum comprising a controlled pulse generator to generate said pulse signals, width control apparatus to control the width of said pulse signals, a permanent control track on said rotatable magnetic drum, and a control head positioned adjacent to said permanent control track to generate a control signal when said rotatable magnetic drum is rotated, said controlled pulse generator being receptive to the said control signal and operative to vary the repetition rate of the pulse signals and to restore synchronism when a continued deviation from synchronism occurs between the pulse repetition rate and the control signal frequency; said controlled pulse generator comprising a pulse generator, and a deviation detector receptive to the pulse and control signals and operative to vary the pulse repetition rate of the pulse generator when a continued deviation from synchronism occurs.

4. A timing system for controlling the pulse repetition rate and the width of pulse signals employed in an electronic digital computer having a rotatable magnetic drum comprising a controlled pulse generator to generate said pulse signals, width control apparatus to control the width of said pulse signals, a control track on said rotatable magnetic drum, and a control head positioned adjacent to said control track to generate a control signal when said rotatable magnetic drum is rotated, said controlled pulse generator being receptive to the control signal and operative to vary the repetition rate of the pulse signals and to restore synchronism when a continued deviation from synchronism occurs between the pulse repetition rate and the control signal frequency; said controlled pulse generator comprising an oscillator to generate a sine wave signal having a frequency equal to the pulse repetition rate of said pulse signals, a shaper to shape the sine wave signal into said pulse signals, the width of said pulse signals being proportional to the bias on said shaper, and a deviation detector receptive to said control and pulse signals and operative to vary the oscillator frequency when a continued deviation from synchronism occurs.

5. A timing system for controlling the pulse repetition rate and the width of pulse signals employed in an electronic digital computer having a rotatable magnetic drum comprising a controlled pulse generator to generate pulse signals, width control apparatus to control the width of the pulse signals, a control track on said rotatable magnetic drum, and a control head positioned adjacent to said control track to generate a control signal when the rotatable magnetic drum is rotated, said controlled pulse generator being receptive to the control signal and operative to vary the repetition rate of the pulse signals and to restore synchronism when a continued deviation from synchronism occurs between the pulse repetition rate and the control signal frequency; said controlled pulse generator comprising an oscillator to generate a sine wave signal having a frequency equal to the pulse repetition rate of the pulse signals, a shaper to shape the sine wave signal into the pulse signals, the width of the pulse signals being proportional to the bias on said shaper, and a deviation detector receptive to the control and pulse signals and operative to vary the oscillator frequency when a continued deviation from synchronism occurs; said width control apparatus comprising an asymmetric pulse detector to generate an error signal having a magnitude related to the amount of asymmetry of the pulse signals, and means to vary the bias on said shaper in proportion to the magnitude of the error signal to restore symmetry to the pulse signals.

References Cited in the file of this patent

UNITED STATES PATENTS

| | | |
|---|---|---|
| 2,362,503 | Scott | Nov. 14, 1944 |
| 2,406,978 | Wendt et al. | Sept. 3, 1946 |
| 2,459,699 | Hallmark | Jan. 18, 1949 |
| 2,513,683 | Shaper et al. | July 4, 1950 |
| 2,594,731 | Connolly | Apr. 29, 1952 |
| 2,614,169 | Cohen et al. | Oct. 14, 1952 |
| 2,617,040 | Bailey | Nov. 4, 1952 |
| 2,630,529 | Mann et al. | Mar. 3, 1953 |
| 2,652,554 | Williams et al. | Sept. 15, 1953 |
| 2,712,065 | Elbourn et al. | June 28, 1955 |